Patented Sept. 10, 1940

2,214,397

UNITED STATES PATENT OFFICE 2,214,397

PLASTICIZED SYNTHETIC LINEAR POLYAMIDE COMPOSITION

Paul R. Austin, Wilmington, Del., assignor to E. I. du Pont de Nemours & Company, Wilmington, Del., a corporation of Delaware No Drawing. Application July 25, 1938, Serial No. 221,263

10 Claims. (Cl. 260—33)

This invention relates to synthetic linear condensation polymers, and more particularly to plasticized compositions comprising these polymers.

A new class of fiber-forming materials known as synthetic linear condensation polymers ("superpolymers") is described in United States Patents 2,071,250–2,071,253. A characteristic property of these polymers is that they can be formed into filaments which can be cold drawn to fibers showing molecular orientation along the fiber axis. Of these polymers the polyamides are particularly useful for the preparation of fibers, bristles, ribbons, rods, tubes, sheets, and the like. The polyamides are of two types, those derived from polymerizable monoaminomonocarboxylic acids and their amide-forming derivatives, and those derived from the reaction of suitable diamines with suitable dicarboxylic acids or amide-forming derivatives of dibasic carboxylic acids. It will be noted that the polyamides are derived from bifunctional amide-forming reactants. On hydrolysis with mineral acids the polyamides revert to the bifunctional reactants from which they are derived. For example, a polyamide derived from a diamine and a dibasic acid yields, on hydrolysis with hydrochloric acid, the dibasic acid and the diamine hydrochloride.

Although synthetic linear condensation polyamides as a class are microcrystalline and have fairly high and sharp melting points, they can be formed into many useful objects without the use of solvents or plasticizers. This is accomplished by spinning, extruding, or otherwise forming the objects from the molten polyamides. To improve the properties of the products thus formed, it is generally desirable to subject them to a process of cold drawing (application of tensile stress) or to a process of cold rolling (application of compressive stress) or by subjecting them to both cold drawing and cold rolling. The process of cold drawing and cold rolling to bring about orientation of the polyamide molecules will be referred to generally as cold working. The products thus formed are unusually strong, have high melting points, and for many purposes are sufficiently pliable. For certain uses, however, and particularly for use in the form of films, sheets, and the like, greater pliability is sometimes desired.

Because of the marked difference in structure and properties, e. g., solubility and compatibility characteristics, between the polymers with which the present invention is concerned and fiber-forming materials derived from cellulosic derivatives, the plasticizer requirements of these two classes of materials differ very markedly. For these reasons it is impossible to predict whether a given plasticizer for a cellulose derivative will function as a polyamide plasticizer. The fact that polyamides are insoluble in the solvents used for cellulosic materials and are in general soluble only in phenols and formic acid is also a limiting factor in the selection of a plasticizer to be incorporated by the customary solvent procedure. Another factor which must be taken into consideration is that polyamides, unlike cellulosic derivatives, are susceptible to cold drawing and that polyamide filaments, ribbons, and the like are normally cold drawn before they are used. For the preparation of such products the plasticizer must be one which does not interfere with cold drawing.

This invention has as an object the preparation of new compositions useful in making filaments, bristles, rods, tubes, ribbons, films, sheets, and the like. A further object is to improve the properties, particularly the pliability of synthetic linear condensation polyamides and of articles derived therefrom.

These and other objects which will be apparent from the following description are accomplished by incorporating in the polyamide a cyclic ketone in which the carbonyl group forms a part of the ring structure, i. e. in which the carbon atom of the carbonyl group is a member of the ring.

A convenient method for incorporating the ketone in the polyamide consists in immersing the polyamide in sheet form in a solution of the ketone in a non-solvent for the polyamide. Concentrated solutions of the ketone in alcohol are especially useful. Under these conditions the ketone is absorbed by the polyamide sheet. In many instances selective absorption occurs as evidenced by the fact that concentration of the plasticizer within the polyamide can be made to exceed that within the solution. After the desired amount of ketone has been absorbed by the polyamide, the sheet is removed and dried. In the solid plasticized products of this invention the amount of ketone ranges from 1% to 40% by weight of the polyamide, the amount used depending upon the nature of the ketone and the properties required in the final product.

The plasticizing effect of the ketone is enhanced by the presence within the polyamide article of a small amount of alcohol or water. The amount of water which the polyamide sheet absorbs from the air under ordinary conditions of humidity, although only a few per cent, is usually sufficient for this purpose.

Other methods of incorporating the ketone can be used. For example, the polyamide and ketone can be dissolved in a mutual solvent and the solution used in making films, filaments, rods, and the like, either by evaporative or coagulative methods. The lower fatty acids, e. g. formic acid, are useful solvents for this purpose. Phenols can also be used to advantage. In certain cases, e. g. in the case of the interpolyamides, alcohols and mixtures of alcohols and halogenated hydrocarbons can be used as solvents. Another method of incorporating the ketone consists in adding it to the molten polyamide. When this is done it is desirable to exclude oxygen, since this tends to darken the polyamide. Still another method of incorporating the ketone consists in adding the ketone to the monomeric reactants, e. g. diamine and dibasic acid, from which the polyamide is prepared.

The following examples are illustrative of methods for carrying out the invention.

Example I

A thin sheet was prepared by extruding molten fiber-forming polyhexamethylene adipamide, the synthetic linear condensation polymer derived from hexamethylenediamine and adipic acid, between rollers immersed in cold water. A sample of this sheet was immersed in a saturated solution of camphor in 65% aqueous ethyl alcohol maintained at 75° C. The sheet was removed after 2.5 hours, rinsed twice with 65% aqueous alcohol, and dried to constant weight in a desiccator over calcium chloride. The sheet showed an increase in weight of 9.4%. It was pliable and soft and melted at 250°–252° C., as determined on a copper block in air, as compared to 254° C. for unplasticized polyhexamethylene adipamide.

Example II

A polyhexamethylene adipamide sheet prepared as described in Example I was immersed in a 20% solution of beta-naphthanone in 50% aqueous alcohol, maintained at 70°–75° C. After 3 hours' immersion the sheet was removed from the solution, rinsed twice with 50% aqueous alcohol and dried. The resultant sheet, which contained 5% of beta-naphthanone, was more pliable and workable than the original unplasticized sheet.

Example III

A copolyamide or interpolyamide was prepared by heating equimolecular amounts of hexamethylene diammonium adipate and decamethylene diammonium sebacate at 230°–250° C. under conditions permitting the removal of the water formed during the reaction until the polymer had an intrinsic viscosity of about 1.0. Ten (10) parts of this polyamide, 7 parts of diamyl phenol, and 4 parts of camphor were dissolved by heating at 100° C. for 3 hours in 38 parts of a solvent composed of 18 parts of chloroform, 12 parts of methyl alcohol and 8 parts of n-butyl alcohol. A portion of this solution was poured onto a glass plate which had previously been heated to about 40° C. By means of a suitable doctor knife the solution was spread to an even layer and then baked at 100° C. for one hour to remove solvent. The resultant plasticized polyamide film was removed from the plate by soaking in water for 30 minutes. The film was clear and elastic, and was pliable even when chilled to 0° F. It had a tensile strength of 2640 pounds per square inch calculated on the original dimensions, and 6000 pounds per square inch calculated on break dimension.

It is to be understood that the aforementioned examples are merely illustrative of the compositions of this invention and their manner of preparation. As examples of additional synthetic linear condensation polyamides which can be plasticized by the addition of cyclic ketones may be mentioned polytetramethylene sebacamide, polypentamethylene adipamide, polypentamethylene sebacamide, polyhexamethylene suberamide, polyhexamethylene sebacamide, polyoctamethylene adipamide, polydecamethylene carbamide, poly-p-xylylene sebacamide, polyphenylene diacetamide, and the polyamide derived from 3,3'-diaminodipropyl ether and adipic acid. Polymerized 6-aminocaproic acid, polymerized 9-aminononanoic acid, and polymerized 11-aminoundecanoic acid are additonal examples of linear condensation polyamides which may be used. As illustrated in Example III, interpolyamides can likewise be plasticized by ketones. Obviously, the invention is also applicable to mixtures of polyamides. In general the synthetic linear condensation polyamides do not possess fiber-forming properties unless they have an intrinsic viscosity above 0.4. Likewise, to be useful in making films, ribbons, tubes, rods, etc., the polyamide should have an intrinsic viscosity above 0.4 and preferably above 0.6. The expression, intrinsic viscosity, is to be understood in accordance with the definition thereof contained in Carothers U. S. Patent 2,130,948.

Instead of the polyamides mentioned above which are obtainable from bifunctional polyamide-forming reactants as essentially sole reactants, I may use the linear condensation polyamides obtained by including with the polyamide-forming reactants used to prepare the polyamide other bifunctional reactants, such as glycols and hydroxy acids. As examples of such modified polyamides may be mentioned those derived from diamines, dibasic acids, and glycols; those derived from diamines, dibasic acids, and hydroxy acids; those derived from amino acids, dibasic acids, and glycols; and those derived from amino acids and hydroxy acids. Although these products contain ester linkages they can still be referred to as polyamides since they contain a plurality of amide linkages and retain many of the desirable properties of the straight polyamides. Like the straight polyamides, these modified polyamides do not exhibit fiber-forming properties until their intrinsic viscosity is at least 0.4.

As additional examples of ketones which may be used in making the compositions of this invention may be mentioned the alkyl cyclohexanones, the alkyl cyclopentanones, alpha-naphthanone, phthalide, coumarin, dimethyl camphor, camphenone, fenchone, and isofenchone.

This invention is not limited to compositions consisting of polyamide and cyclic ketone alone. As already indicated, the plasticizing effect in the ketone is increased by the presence of a small amount of water. Other hydroxylated non-solvents for the polymers, and particularly alcohols, such as methanol, propanol, isobutanol, benzyl alcohol, cyclohexanol, hexamethylene glycol and glycerol, have a similar effect. Moreover, there may be associated with the polyamide-ketone compositions other types of plasticizers, e. g. dibutyl phthalate, tricresyl phosphate, carboxylic acids, e. g. lactic acid and mandelic acid, amides, particularly N-alkyl sulfonamides, and phenols, e. g. diamyl phenol. Particularly desirable compositions are obtained by using the cyclic ketone in conjunction with a phenol (Example III) or a sulfonamide. Compositions of this invention may also contain other types of modifying agents, e. g., luster modifying materials, pigments, dyes, antioxidants, oils, antiseptics, cellulose derivatives, etc.

The cyclic ketones used in the practice of this invention not only comply with the requirement mentioned above of not interfering with cold drawing or cold working, but also actually improve the working properties, and particularly cold rolling.

The polyamide-cyclic ketone compositions are useful in many forms and for many purposes. Typical applications are yarns, fabrics, bristles, surgical sutures, dental floss, fish lines, fish nets, fishing leaders, rods, tubes, films, ribbons, sheets, safety glass interlayers, electrical insulation (e. g., for wires), molded articles, adhesives, impregnating agents, and coating compositions. An advantage which these compositions have over unmodified polyamides is that they are more pliable. This fact is most important in connection with the use of a product in sheet form. A further advantage of these compositions over unmodified polyamides is that they are more readily cold rolled.

As many apparently widely different embodiments of this invention may be made without departing from the spirit and scope thereof, it is to be understood that I do not limit myself to the specific embodiments thereof except as defined in the appended claims.

I claim:

1. A plasticized synthetic linear polyamide containing as a plasticizing agent a cyclic ketone in which a carbonyl group forms a part of the ring structure, the said polyamide being one which is capable of being drawn into fibers showing by X-ray pattern orientation along the fiber axis.

2. A plasticized synthetic linear polyamide containing as a plasticizing agent a cyclic ketone in which a carbonyl group forms a part of the ring structure, the said polyamide being one which has an intrinsic viscosity of at least 0.4 and which yields on hydrolysis with hydrochloric acid a mixture comprising a diamine hydrochloride and a dicarboxylic acid.

3. A synthetic linear polyamide plasticized with a mixture comprising a cyclic ketone in which a carbonyl group forms a part of the ring structure and a hydroxylated non-solvent for the polyamide, the said polyamide being one which has an intrinsic viscosity of at least 0.4.

4. The plasticized polyamide set forth in claim 3 in which the said hydroxylated non-solvent is water.

5. The plasticized synthetic linear polyamide set forth in claim 1 wherein the said cyclic ketone is camphor.

6. The plasticized synthetic linear polyamide set forth in claim 1, wherein the said cyclic ketone is an alkyl cyclohexanone.

7. The plasticized synthetic linear polyamide set forth in claim 1; the said polyamide being an interpolyamide.

8. The plasticized synthetic linear polyamide set forth in claim 1; the said polyamide being substantially identical with that obtained by the interpolymerization of hexamethylene diammonium adipate and decamethylene diammonium sebacate.

9. The plasticized synthetic linear polyamide set forth in claim 2; the said polyamide being one which yields on hydrolysis with hydrochloric acid a mixture comprising hexamethylene diamine hydrochloride and adipic acid.

10. A plasticized synthetic linear polyamide containing as a plasticizing agent a cyclic ketone in which a carbonyl group forms a part of the ring structure, the said polyamide being one which has an intrinsic viscosity of at least 0.4.

PAUL R. AUSTIN.